(12) United States Patent
Lin (10) Patent No.: US 12,361,152 B2
(45) Date of Patent: Jul. 15, 2025

(54) INFORMATION PROCESSING METHOD AND APPARATUS, TERMINAL, AND STORAGE MEDIUM

(71) Applicant: BEIJING ZITIAO NETWORK TECHNOLOGY CO., LTD., Beijing (CN)

(72) Inventor: Shihong Lin, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 18/520,394

(22) Filed: Nov. 27, 2023

(65) Prior Publication Data

US 2024/0095389 A1 Mar. 21, 2024

Related U.S. Application Data

(63) Continuation of application No. PCT/CN2022/089571, filed on Apr. 27, 2022.

(30) Foreign Application Priority Data

Jun. 15, 2021 (CN) .......................... 202110662737.X (51) Int. Cl.
  *G06F 21/62* (2013.01)
(52) U.S. Cl.
  CPC ................................ *G06F 21/6218* (2013.01)
(58) Field of Classification Search
  CPC .................................................. G06F 21/6218
  See application file for complete search history.

(56) References Cited

U.S. PATENT DOCUMENTS 6,983,416 B1  1/2006 Bae et al.
2003/0037029 A1*  2/2003 Holenstein .......... G06F 16/2343
(Continued)

FOREIGN PATENT DOCUMENTS

CN    107273343 A    10/2017
CN    109255587 A    1/2019
(Continued)

OTHER PUBLICATIONS

International Patent Application No. PCT/CN2022/089571; Int'l Search Report; dated Jul. 27, 2022; 3 pages.

*Primary Examiner* — Meng Li
(74) *Attorney, Agent, or Firm* — BakerHostetler (57) ABSTRACT

The present disclosure provides an information processing method and apparatus, a terminal, and a storage medium. The information processing method comprises: according to an information read request of a client, determining a user identity corresponding to the client, first data information requested to be read, and a read permission corresponding to the user identity; generating adjusted first data information on the basis of the user identity, the first data information, and the read permission; and sending the adjusted first data information to the client. The column data information in the present disclosure is allowed to be adjusted on the basis of the read permission, and compared with a solution that a permission can only be set for the row data information, the security of the data information is better improved.

19 Claims, 8 Drawing Sheets

(56) References Cited

U.S. PATENT DOCUMENTS

| | | | | |
|---|---|---|---|---|
| 2004/0078569 | A1* | 4/2004 | Hotti | G06F 21/6227 |
| | | | | 713/165 |
| 2009/0063437 | A1* | 3/2009 | Hendrey | H04L 67/02 |
| 2012/0173535 | A1 | 7/2012 | Ramakrishnan et al. | |
| 2012/0246336 | A1* | 9/2012 | Sathish | G06F 9/5055 |
| | | | | 709/238 |
| 2013/0117376 | A1* | 5/2013 | Filman | G06Q 10/10 |
| | | | | 709/205 |
| 2017/0041322 | A1* | 2/2017 | Kurian | H04L 67/10 |
| 2018/0121665 | A1 | 5/2018 | Anderson et al. | |
| 2019/0238551 | A1* | 8/2019 | Gassner | G06F 21/6218 |
| 2019/0258811 | A1* | 8/2019 | Ferraiolo | G06F 21/6218 |
| 2020/0372161 | A1* | 11/2020 | Wu | H04L 67/306 |
| 2021/0019063 | A1* | 1/2021 | Lee | G06F 11/1484 |

FOREIGN PATENT DOCUMENTS

| | | | | |
|---|---|---|---|---|
| CN | 110019279 | A | | 7/2019 |
| CN | 110968890 | A | * | 4/2020 |
| CN | 111339557 | A | | 6/2020 |
| CN | 111460432 | A | | 7/2020 |
| CN | 111709055 | A | * | 9/2020 |
| CN | 112100585 | A | | 12/2020 |
| CN | 112580311 | A | | 3/2021 |
| CN | 113407916 | A | | 9/2021 |

\* cited by examiner

INFORMATION PROCESSING METHOD AND APPARATUS, TERMINAL, AND STORAGE MEDIUM

CROSS REFERENCE TO RELATED APPLICATIONS

The present application is the continuation application of International Application No. PCT/CN2022/089571, titled "INFORMATION PROCESSING METHOD AND APPARATUS, TERMINAL, AND STORAGE MEDIUM", filed on Apr. 27, 2022, which claims priority to Chinese Patent Application No. 202110662737.X, filed on Jun. 15, 2021, and entitled "INFORMATION PROCESSING METHOD AND APPARATUS, TERMINAL, AND STORAGE MEDIUM", the entire contents of both of which are incorporated herein by reference in their entireties.

TECHNICAL FIELD

The present disclosure relates to the field of information technology, in particular to an information processing method and apparatus, a terminal, and a storage medium.

BACKGROUND

Current collaboration of data information (for example, online tables) is a trend, facilitates sharing of the data information, and improves processing efficiency of the data information. However, collaboration efficiency and security of the data information still need to be improved.

SUMMARY

To solve the existing problems, the present disclosure provides an information processing method and apparatus, a terminal and a storage medium.

The following technical solutions are adopted in the disclosure.

An embodiment of the present disclosure provides an information processing method, the information processing method comprises: determining a user identity corresponding to a client, first data information requested for reading, and a read permission corresponding to the user identity according to an information reading request of the client; generating adjusted first data information based on the user identity, the first data information, and the read permission; and sending the adjusted first data information to the client, wherein the first data information is allowed for online collaboration and comprises row data information and column data information, the column data information is allowed to be adjusted based on the read permission, wherein the column data information is allowed to be adjusted based on the read permission comprises shielding or deleting data information without read permissions.

Another embodiment of the present disclosure provides an information processing apparatus, the information processing apparatus comprises: a determination module configured to determine a user identity corresponding to a client, first data information requested for reading, and a read permission corresponding to the user identity according to an information reading request of the client; a data adjustment module configured to generate adjusted first data information based on the user identity, the first data information, and the read permission; and a data sending module configured to send the adjusted first data information to the client, wherein the first data information is allowed for online collaboration and comprises row data information and column data information, the column data information is allowed to be adjusted based on the read permission, wherein the column data information is allowed to be adjusted based on the read permission comprises shielding or deleting data information without read permissions.

Another embodiment of the present disclosure provides an information processing method, the information processing method comprises: receiving, by a client, permission rule updates pushed by a system for first data information, wherein the client is allowed to access to first adjusted first data information, and the first adjusted first data information is determined based on a user identity corresponding to the client, the first data information, and permission rules; determining second adjusted first data information based on the user identity, the first data information, and updated permission rules; and adjusting the first adjusted first data information to the second adjusted first data information, wherein adjusting the first adjusted first data information to the second adjusted first data information comprises shielding or deleting data information without read permissions.

Another embodiment of the present disclosure provides an information processing apparatus, the information processing apparatus comprises: a permission rule update receiving module configured to allow a client to receive permission rule updates pushed by a system for first data information, wherein the client is allowed to access to first adjusted first data information, and the first adjusted first data information is determined based on a user identity, first data information, and permission rules corresponding to the client; an adjusted information determination module configured to determine second adjusted first data information based on the user identity, the first data information, and updated permission rules; and a data adjustment module configured to adjust the first adjusted first data information to the second adjusted first data information, wherein adjust the first adjusted first data information to the second adjusted first data information comprises shielding or deleting data information without read permissions.

Some embodiments of the present disclosure provide a terminal device, the terminal device comprising: at least one memory and at least one processor; wherein the memory is configured to store program code, and the processor is configured to call the program code stored by the memory to perform the above information processing method.

Some embodiments of the present disclosure provide a storage medium for storing program code, wherein the program code, when executed by a processor, cause the processor to perform the above information processing method.

According to the embodiments of the present disclosure, data information is adjusted based on a user identity, first data information, and a read permission, and the adjusted data information is sent to a corresponding user, thereby improving security of the data information. In addition, column data information of the present disclosure is allowed to be adjusted based on read permissions, which better improves the security of the data information compared with a solution that can set permissions for only row data information.

BRIEF DESCRIPTION OF THE DRAWINGS

These and other features, advantages and aspects of embodiments of the present disclosure will become more apparent in conjunction with the drawings and with reference to the following specific embodiments. Throughout the drawings, identical or similar appended marks indicate identical or similar elements. It should be understood that the drawings are schematic and that the elements and components are not necessarily drawn to scale.

DETAILED DESCRIPTION OF PREFERRED EMBODIMENTS

Embodiments of the present disclosure will be described in greater detail below with reference to the drawings. While certain embodiments of the present disclosure are shown in the drawings, it should be understood that the present disclosure may be implemented in various forms and should not be construed as being limited to the embodiments set forth herein, but instead are provided for a more thorough and complete understanding of the present disclosure. It should be understood that the drawings and embodiments of the present disclosure are for exemplary purposes only and are not intended to limit the scope of protection of the present disclosure.

It should be understood that the steps documented in the device embodiments of the present disclosure may be performed in a different order, and/or in parallel. In addition, the device embodiments may include additional steps and/or omit to perform the steps shown. The scope of the present disclosure is not limited in this regard.

The term "includes" and variations thereof as used herein are open-ended, i.e., "includes but is not limited to". The term "based on" is "based, at least in part, on". The term "an embodiment" means "at least one embodiment"; the term "another embodiment" means "at least one additional embodiment"; the term "some embodiment" indicates "at least some embodiments". Related definitions of other terms will be given in the description below.

It should be noted that the concepts of "first" and "second" mentioned in this disclosure are used only to distinguish between different devices, modules or units, and are not intended to define the order or interdependence of the functions performed by these devices, modules or units.

It should be noted that the modifications of "one" referred to in this disclosure are illustrative rather than limiting, and it should be understood by those skilled in the art to mean "one or more" unless the context clearly indicates otherwise.

The names of the messages or information interacted between the plurality of devices in this implementation of the disclosure are used for illustrative purposes only and are not intended to limit the scope of those messages or information.

Figure 1:
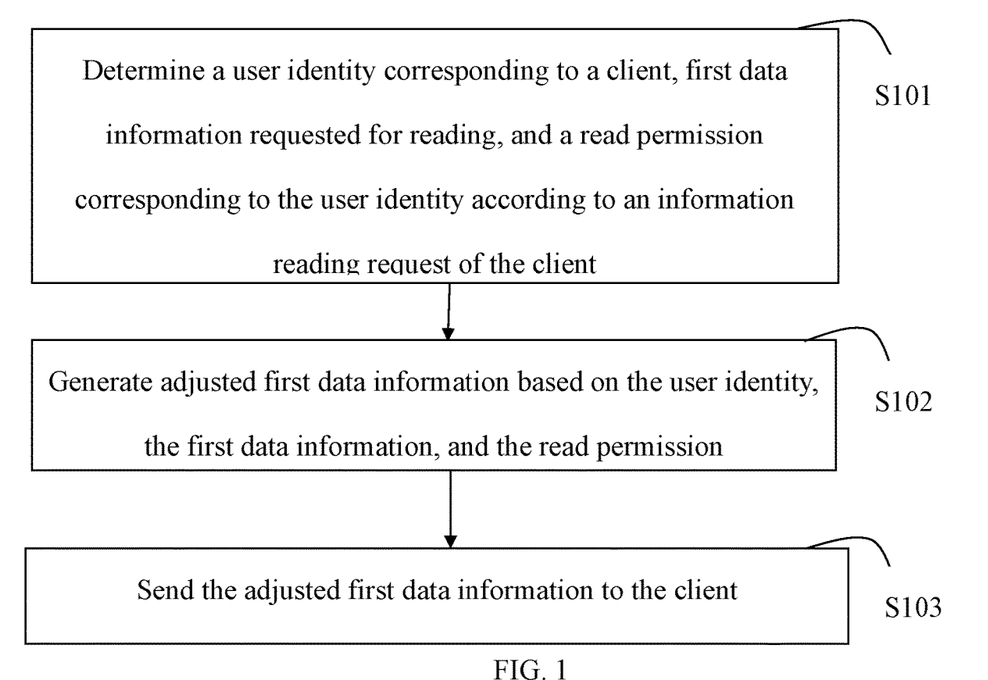
FIG. 1 is a flowchart of an information processing method according to an embodiment of the present disclosure.

FIG. 1 provides a flowchart of an information processing method according to an embodiment of the present disclosure. The information processing method of the present disclosure includes step S101: determining a user identity corresponding to a client, first data information requested for reading, and a read permission corresponding to the user identity according to an information reading request of the client. In some embodiments, the first data information allows online collaboration, that is, allows a plurality of users to synchronize data information. When the data information is edited by a user, users with permissions to view the edited information can also see the corresponding edited information. In some embodiments, the data information of the present disclosure may be online tables. In some embodiments, when the information reading request is received from the client, the identity of the user requesting to read information, the corresponding first data information requested for reading, and the permission of the user may be determined to determine which information the user can read and which information the user cannot read.

The information processing method of the present disclosure further includes step S102: generating adjusted first data information based on the user identity, the first data information, and the read permission. In some embodiments, when it is determined that the user has no corresponding read permission in the first data information, the first data information needs to be adjusted by shielding or deleting data information that the user has no read permission, to generate the adjusted first data information, so as to ensure security of the first data information and prevent unauthorized users from reading corresponding confidential information.

The method of the present disclosure further includes step S103: sending the adjusted first data information to the client for the client to read corresponding information. After adjustment, the adjusted first data information is data information that the user requesting for reading has the corresponding read permission. In this way, the security of data information is improved. In addition, the data information (for example, the first data information) of the present disclosure includes row data information and column data information. The column data information is allowed to be adjusted based on the read permission, which can better improve the security of the data information compared with a solution that can set permissions for only row data information.

Figure 2:
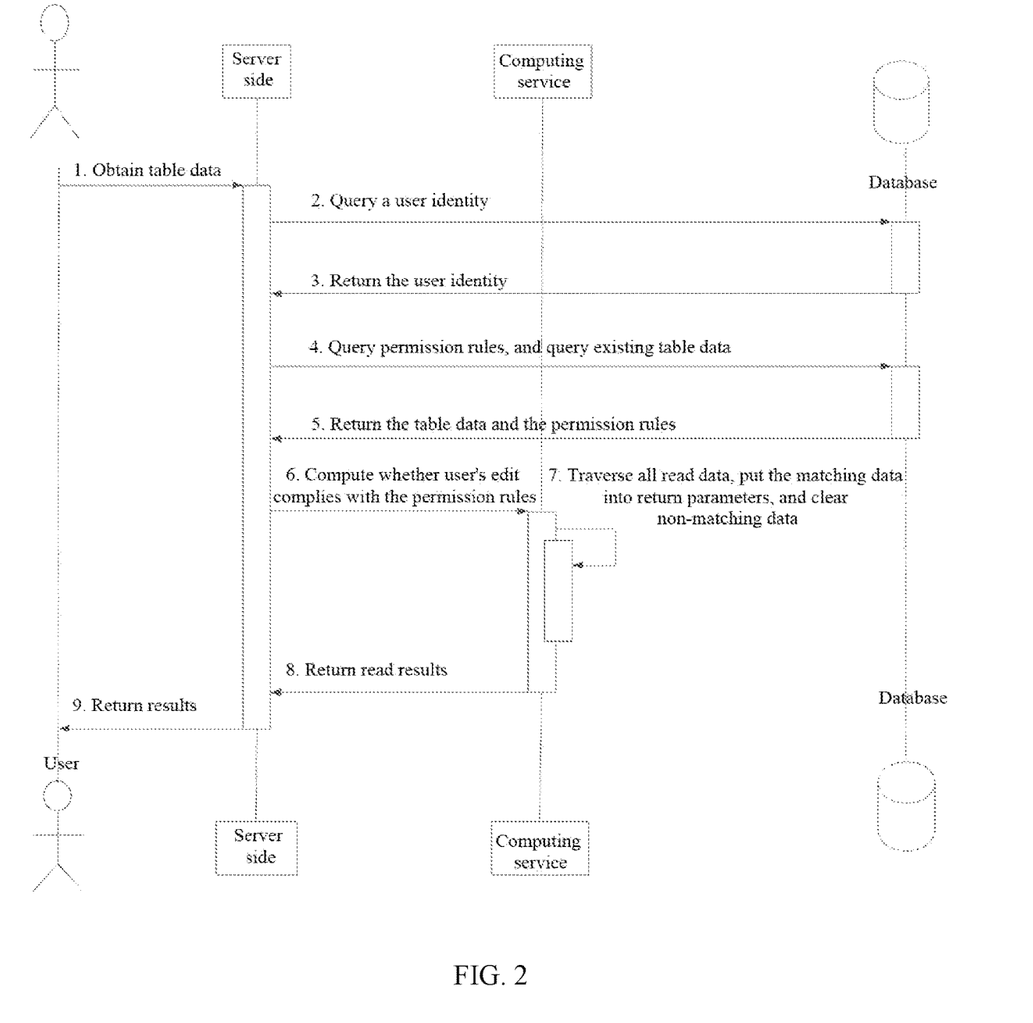
FIG. 2 shows a schematic diagram of a data information reading process according to some embodiments of the present disclosure.

Refer to FIG. 2, which shows a schematic diagram of a data information reading process according to some embodiments of the present disclosure. Taking online table data as an example, an information reading request that a user desires to obtain table data is first received. Then a system (for example, the following server, which may include a server side, a computing service, a database, and the like) queries a user identity corresponding to the client. It should be understood that, although FIG. 2 shows a server side, a computing service, and a database, the three items may be collectively referred to as a server, or distributed servers may be used to place, in different locations, a database for storing information, a computing service for processing information, and a server interface side. After the database returns the user identity, user's permission rules and table data desired to be read are queried. After the table data and the permission rules are returned, whether the user's request complies with the permission rules is computed, and data information that the user has corresponding permissions is returned to the user for reading. It should be understood that the query of the data information requested for reading and the query of the permission rules are not clearly limited, the data information requested for reading may be first queried, or the permission rules may be first queried. Through the method of the present disclosure, the security of data information is greatly improved, and unauthorized data information can be prevented from being viewed by relevant users.

In some embodiments, generating adjusted first data information based on the user identity, the first data information, and the read permission includes: determining a readable data range based on the user identity, the first data information, and the read permission; and copying the first data information and adjusting the copied first data information based on the readable data range to generate the adjusted first data information. That is, after the user's readable data range is determined based on the above information, data in the system may be first copied, and the copied data are adjusted to generate the adjusted first data information, which is then sent to the user for reading. In this way, complete data in the server or system do not need to be changed, and only the copied data information is adjusted, which is conducive to maintaining integrity and security of original data information.

Figure 3:
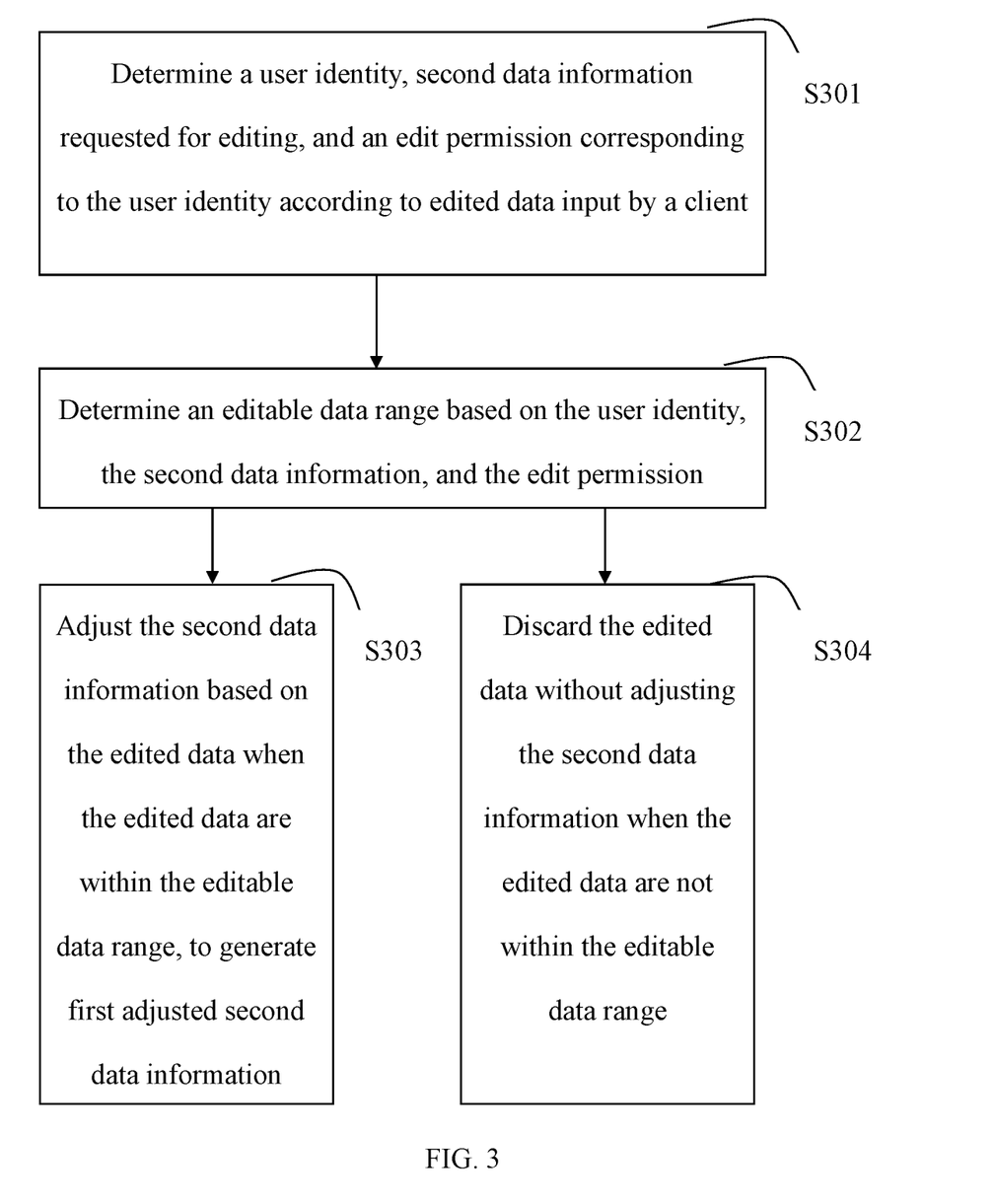
FIG. 3 shows a flowchart of an information processing method according to some embodiments of the present disclosure.

In some embodiments, as shown in FIG. 3, a flowchart of an information processing method according to some embodiments is shown. The information processing method of the present disclosure includes step S301: determining a user identity, second data information requested for editing, and an edit permission corresponding to the user identity according to edited data input by a client. In some embodiments, the second data information may be online tables capable of online collaboration, and column data information of the second data information allows for setting based on permissions. In some embodiments, when user's edited data for the second data information are received, the user identity, the second data information requested for editing, and the edit permission corresponding to the user identity are determined. The information processing method of the present disclosure further includes step S302: determining an editable data range based on the user identity, the second data information, and the edit permission. That is, which data are allowed to be edited by a user is determined. The information processing method of the present disclosure further includes step S303: adjusting the second data information based on the edited data when the edited data are within the editable data range, to generate first adjusted second data information. When the edited data are within a user's edit permission range, it indicates that the corresponding data information allows the user to edit. Therefore, the edited data are combined into the second data information to generate the first adjusted second data information. The information processing method of the present disclosure further includes step S304: discarding the edited data without adjusting the second data information when the edited data are not within the editable data range. That is, when the user has no edit permission for the corresponding data information, the data edited by the user are ignored and invalidated locally without updating the corresponding data information. The process of editing data by the user is similar to the process of reading data by the user in FIG. 2, the latter is to read data, and the former is to write data. For the sake of simplicity, corresponding process descriptions will not be repeated here, and reference may be made to the information processing process in FIG. 2.

In some embodiments, when the edited data are not within the editable data range, a prompt is issued and/or an abnormal value is returned to the client. In some embodiments, issuing a prompt to the client may include prompting that the user has no edit permission for the data information content. Therefore, the user can better understand whether the edited data are accepted, and user interaction is facilitated.

Figure 4:
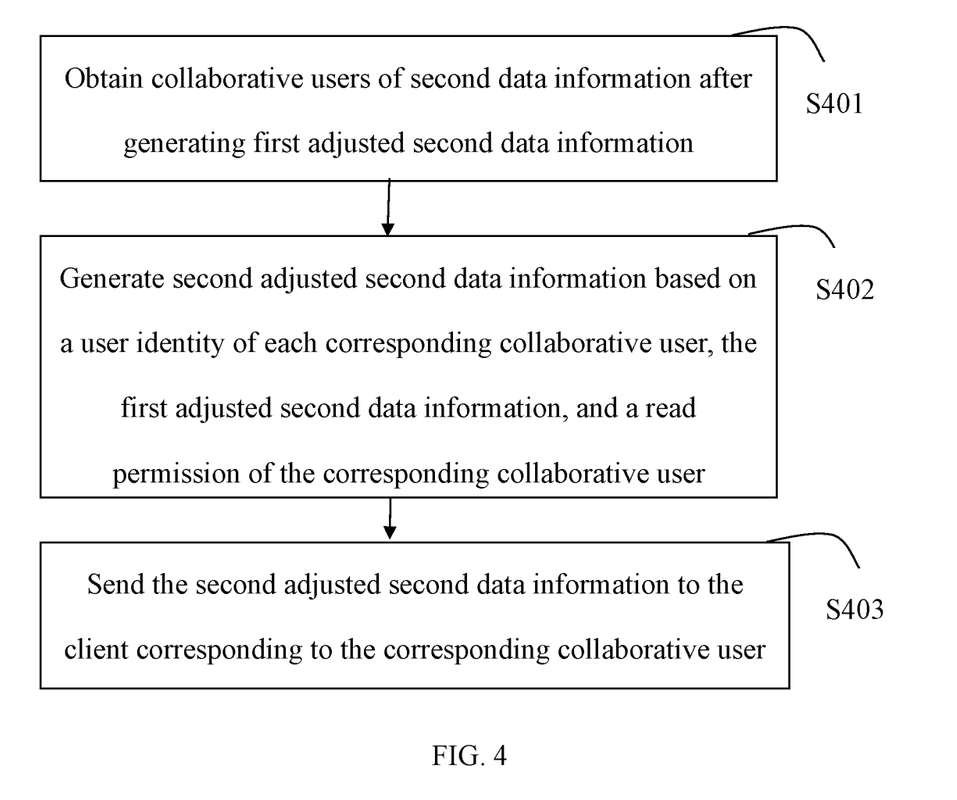
FIG. 4 shows a flowchart of an information processing method according to some embodiments of the present disclosure.

In some embodiments, as shown in FIG. 4, a flowchart of an information processing method according to some embodiments is shown. The information processing method of the present disclosure includes step S401: obtaining collaborative users of second data information after generating first adjusted second data information. That is, when the second data information is adjusted to generate the first adjusted second data information due to user's edit, the updated data information should be collaborated to the collaborative users of the second data information. The information processing method of the present disclosure further includes step S402: generating second adjusted second data information based on a user identity of each corresponding collaborative user, the first adjusted second data information, and a read permission of the corresponding collaborative user. Before the first adjusted second data information is collaborated to other users, the read permission of the corresponding collaborative user for the adjusted data information is determined. If the corresponding collaborative user has no read permission for edited data, that is, the first adjusted second data information adjusted from the second data information has no impact on the collaborative user, collaboration is not required to save resources. The information processing method of the present disclosure further includes step S403: sending the second adjusted second data information to a client corresponding to the corresponding collaborative user. In some embodiments, some collaborative users can see all the adjusted edited data, while other collaborative users can only see some of the adjusted edited data. Therefore, the first adjusted second data information is adjusted to the second adjusted second data information according to the read permission of the corresponding collaborative user, and then the second adjusted second data information is sent to the corresponding collaborative user, to ensure the security of data information and prevent unauthorized users from reading corresponding data information.

In some embodiments, generating second adjusted second data information based on a user identity of each corresponding collaborative user, the first adjusted second data information, and a read permission of the corresponding collaborative user includes: determining a readable data range based on the user identity of each corresponding collaborative user, the first adjusted second data information, and the read permission of the corresponding collaborative user; and for each corresponding collaborative user, copying the first adjusted second data information, and adjusting the copied first adjusted second data information based on the readable data range to generate the second adjusted second data information. By determining the readable data range, unauthorized users are prevented from obtaining data information that should not be read by them, thereby improving the security of the data information. In addition, the data information is copied for each collaborative user, and the copied data information is adjusted, whereby the integrity and security of the original data information in the system can be better maintained.

Figure 5:
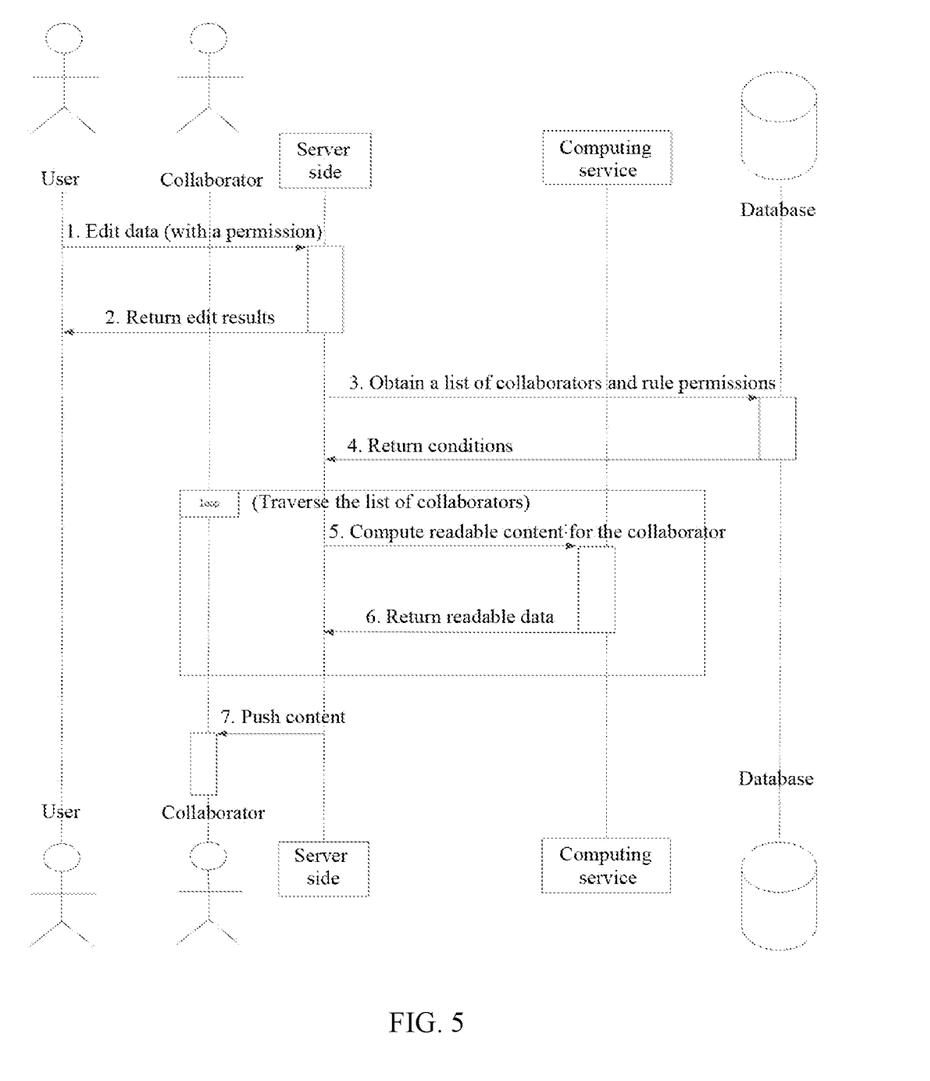
FIG. 5 shows a flowchart of data information collaboration according to some embodiments of the present disclosure.

FIG. 5 shows a flowchart of data information collaboration according to some embodiments of the present disclosure. After data edited by a user with an edit permission are received, original first data information is updated and adjusted to first adjusted first data information, and results are returned to the user who edited the data information. Afterwards, a list of collaborative users of the first data information and corresponding user permissions are obtained. Then, for each collaborative user, a readable range is computed, and the first adjusted first data information is copied. The first adjusted first data information is adjusted according to a read permission of the corresponding collaborative user, to remove the data information that the collaborative user has no permission to read, and to obtain second adjusted first data information. After the above operations are completed for all the collaborative users, the collaboration required for data information update caused by user's edit is completed.

Figure 6:
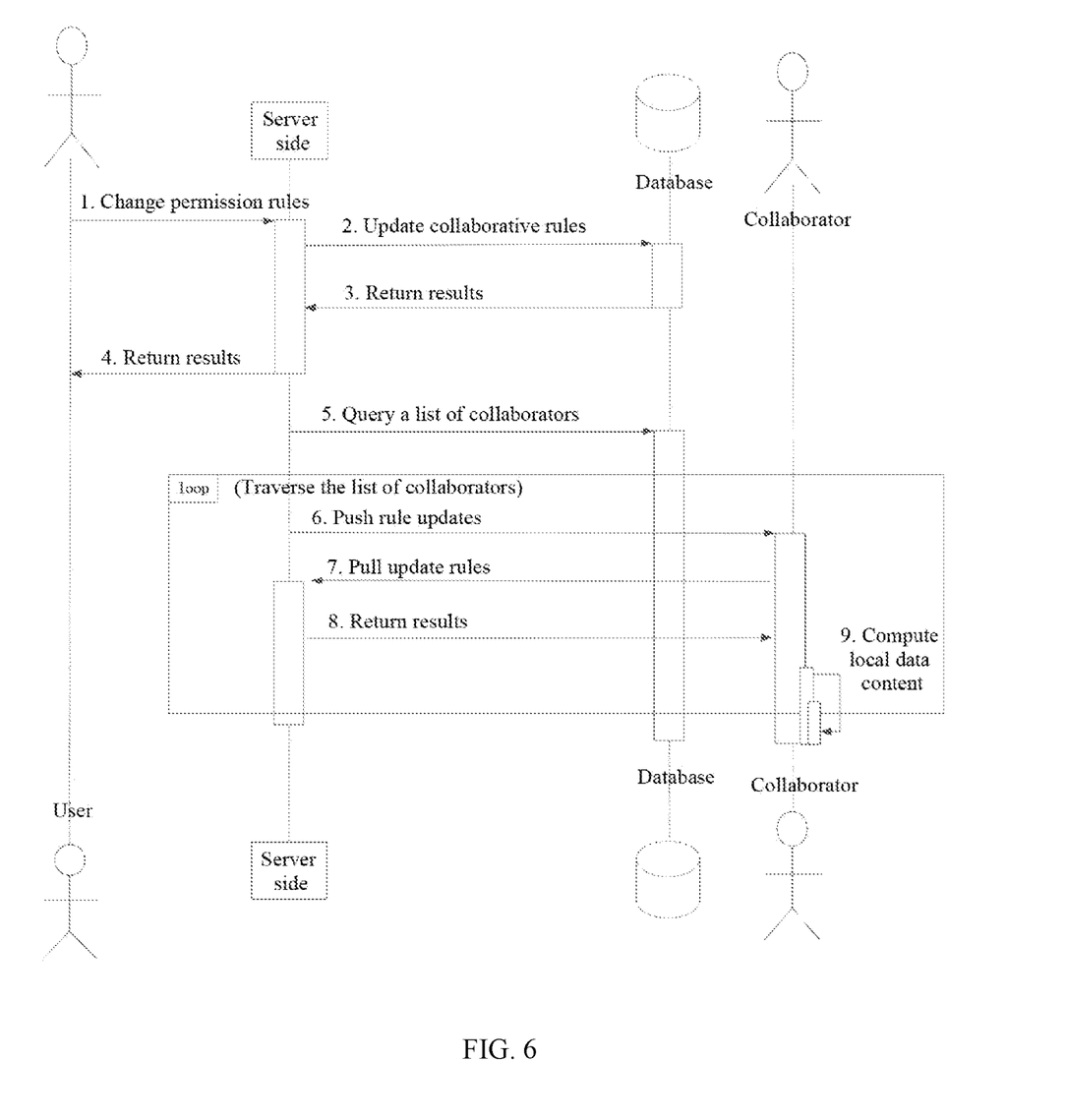
FIG. 6 shows a schematic diagram of collaboration based on permission rule updates according to some embodiments of the present disclosure.

In some cases, an administrator or user with a corresponding permission may modify and update permission rules of data information. In the case that the permission rules are modified, the updated permission rules also need to be collaborated to the collaborative users, so that all the collaborative users adapt to the latest permission rules. Therefore, the information processing method of the present disclosure further includes the following steps: receiving permission rule updates for the first data information to generate updated permission rules; and obtaining, based on the updated permission rules, collaborative users of the first data information whose permissions are adjusted, to push the updated permission rules to each collaborative user. The following description is combined with FIG. 6. FIG. 6 shows a schematic diagram of collaboration based on permission rule updates according to some embodiments of the present disclosure. In some embodiments, after permission rule updates are received, the system updates the permission rules accordingly and returns the updated permission rules. Then, collaborative users of corresponding data information are queried, and the updated permission rules are pushed to these collaborative users, so that these collaborative users update data locally after obtaining the updated permission rules, and the read corresponding data information complies with the latest permission rules. By updating data locally according to the updated permission rules, the system does not need to update data information based on each collaborative user, and then sends the data adjusted according to the updated permission rules to the corresponding collaborative users, thereby greatly saving system resources.

Figure 7:
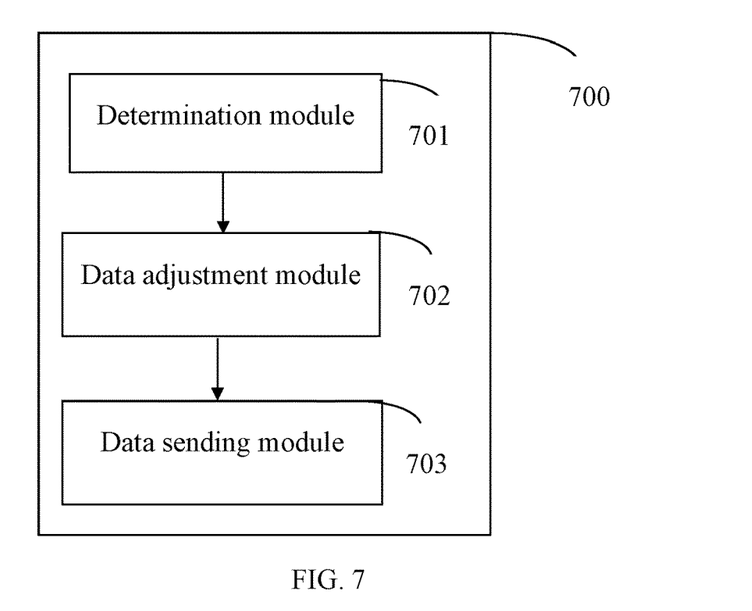
FIG. 7 is a schematic diagram of some modules of an information processing apparatus according to an embodiment of the present disclosure.

An embodiment of the present disclosure further provides an information processing apparatus 700, including a determination module 701, a data adjustment module 702, and a data sending module 703. In some embodiments, the determination module 701 is configured to determine a user identity corresponding to a client, first data information requested for reading, and a read permission corresponding to the user identity according to an information reading request of the client. In some embodiments, the data adjustment module 702 is configured to generate adjusted first data information based on the user identity, the first data information, and the read permission. In some embodiments, the data sending module 703 is configured to send the adjusted first data information to the client. In some embodiments, the first data information is allowed for online collaboration and includes row data information and column data information, the column data information is allowed to be adjusted based on the read permission.

It should be understood that the description of the information processing method also applies to the information processing apparatus 700 here, and for the sake of simplicity, no detailed description will be provided here.

In some embodiments, the generating adjusted first data information based on the user identity, the first data information, and the read permission includes: determining a readable data range based on the user identity, the first data information, and the read permission; and copying the first data information and adjusting the copied first data information based on the readable data range to generate the adjusted first data information. In some embodiments, the determination module is further configured to determine the user identity, second data information requested for editing, and an edit permission corresponding to the user identity according to edited data input by the client; and the data adjustment module is further configured to determine an editable data range based on the user identity, the second data information, and the edit permission; adjust the second data information based on the edited data when the edited data are within the editable data range, to generate first adjusted second data information; and discard the edited data without adjusting the second data information when the edited data are not within the editable data range. In some embodiments, when the edited data are not within the editable data range, a prompt is issued and/or an abnormal value is returned to the client. In some embodiments, the information processing apparatus further includes: a collaborative user obtaining module, configured to obtain collaborative users of the second data information after the first adjusted second data information is generated; the data adjustment module is further configured to generate second adjusted second data information based on a user identity of each corresponding collaborative user, the first adjusted second data information, and a read permission of the corresponding collaborative user; and the data sending module is further configured to send the second adjusted second data information to the client corresponding to the corresponding collaborative user. In some embodiments, the generating second adjusted second data information based on a user identity of each corresponding collaborative user, the first adjusted second data information, and a read permission of the corresponding collaborative user includes: determining a readable data range based on the user identity of each corresponding collaborative user, the first adjusted second data information, and the read permission of the corresponding collaborative user; and for each corresponding collaborative user, copying the first adjusted second data information, and adjusting the copied first adjusted second data information based on the readable data range to generate the second adjusted second data information. In some embodiments, the information processing apparatus further includes: a rule update module, configured to receive permission rule updates for the first data information to generate updated permission rules; and a permission rule push module, configured to obtain, based on the updated permission rules, collaborative users of the first data information whose permissions are adjusted, to push the updated permission rules to each collaborative user.

Figure 8:
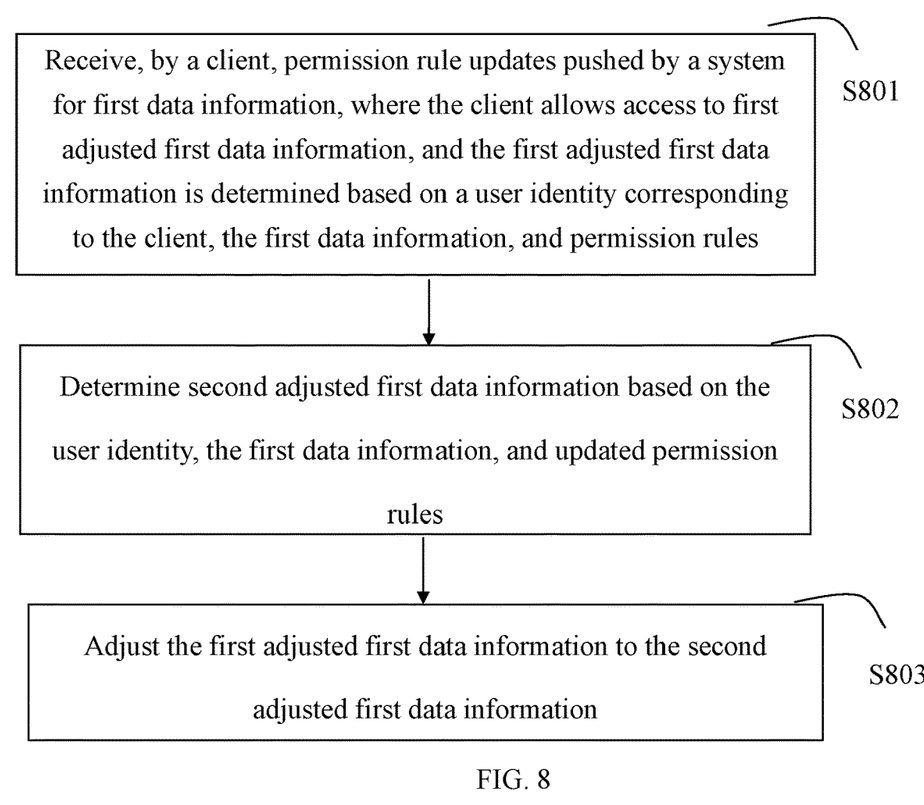
FIG. 8 is a flowchart of an information processing method according to another embodiment of the present disclosure.

FIG. 8 shows a flowchart of an information processing method according to some embodiments of the present disclosure. The information processing method includes step S801: receiving, by a client, permission rule updates pushed by a system for first data information, where the client is allowed to access to first adjusted first data information, and the first adjusted first data information is determined based on a user identity corresponding to the client, the first data information, and permission rules. Combined with FIG. 6, after the permission rules of the system are updated, rule updates are pushed to collaborative users. In this case, the client as a collaborative user may receive the push and obtain the updated permission rules by, for example, pulling the updated permission rules. As mentioned above, the collaborative user may access the first adjusted first data information, where the first adjusted first data information is determined based on the user identity, the first data information, and the permission rules corresponding to the client. That is, the first data information adjusted according to the permission rules is accessed. The information processing method includes step S802: determining second adjusted first data information based on the user identity, the first data information, and updated permission rules. The information processing method includes step S803: adjusting the first adjusted first data information to the second adjusted first data information. That is, the permission rules are changed, so the data information accessed at this time also has corresponding changes according to the permission rules, from the first adjusted first data information to the second adjusted first data information. It should be understood that the data information is adjusted locally on the client according to the updated permission rules, which may save system resources and be completed by a computer where each independent client is located.

In some embodiments, adjusting the first adjusted first data information to the second adjusted first data information includes: deleting data information that has no read permissions anymore from the first adjusted first data information based on the updated permission rules. In some embodiments, the adjusting the first adjusted first data information to the second adjusted first data information includes: obtaining data information with newly added read permissions from the system based on the updated permission rules. It should be understood that the foregoing system may refer to a server.

Figure 9:
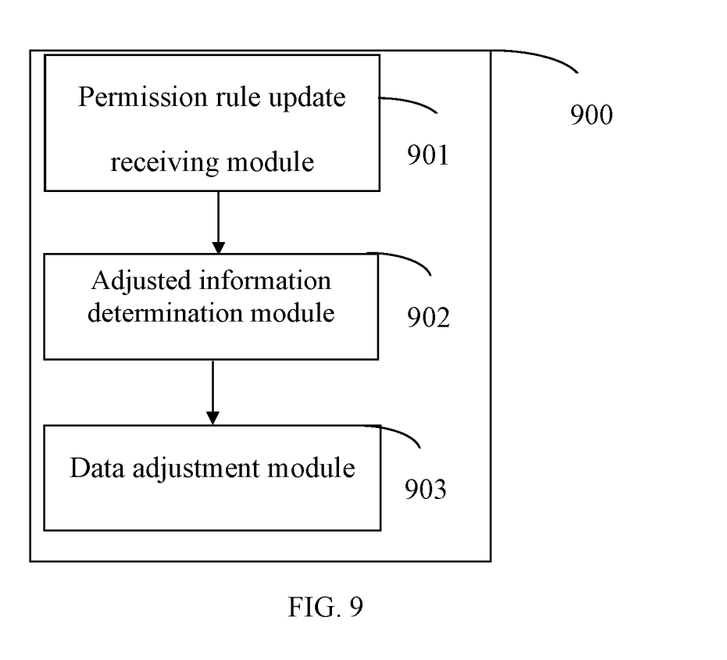
FIG. 9 is a schematic diagram of some modules of an information processing apparatus according to another embodiment of the present disclosure.

An embodiment of the present disclosure further provides an information processing apparatus 900, including a permission rule update receiving module 901, an adjusted information determination module 902, and a data adjustment module 903. In some embodiments, the permission rule update receiving module 901 is configured to allow a client to receive permission rule updates pushed by a system for first data information, where the client is allowed to access to first adjusted first data information, and the first adjusted first data information is determined based on a user identity corresponding to the client, the first data information, and permission rules. In some embodiments, the adjusted information determination module 902 is configured to determine second adjusted first data information based on the user identity, the first data information, and updated permission rules. In some embodiments, the data adjustment module 903 is configured to adjust the first adjusted first data information to the second adjusted first data information.

It should be understood that the description of the information processing method also applies to the information processing apparatus 900 here, and for the sake of simplicity, no detailed description will be provided here.

In some embodiments, the adjusting the first adjusted first data information to the second adjusted first data information includes: deleting data information that has no read permissions anymore from the first adjusted first data information based on the updated permission rules. In some embodiments, the adjusting the first adjusted first data information to the second adjusted first data information includes: obtaining data information with newly added read permissions from the system based on the updated permission rules.

In addition, the present disclosure further provides a terminal, including: at least one memory and at least one processor, where the memory is configured to store program code, and the processor is configured to call the program code stored in the memory to perform the foregoing information processing method.

Moreover, the present disclosure further provides a computer storage medium, the computer storage medium storing program code, and the program code being used for performing the foregoing information processing method.

The information processing methods and apparatuses of the present disclosure are described above based on embodiments and application examples. Moreover, the present disclosure further provides a terminal and a storage medium, which are described below.

Figure 10:
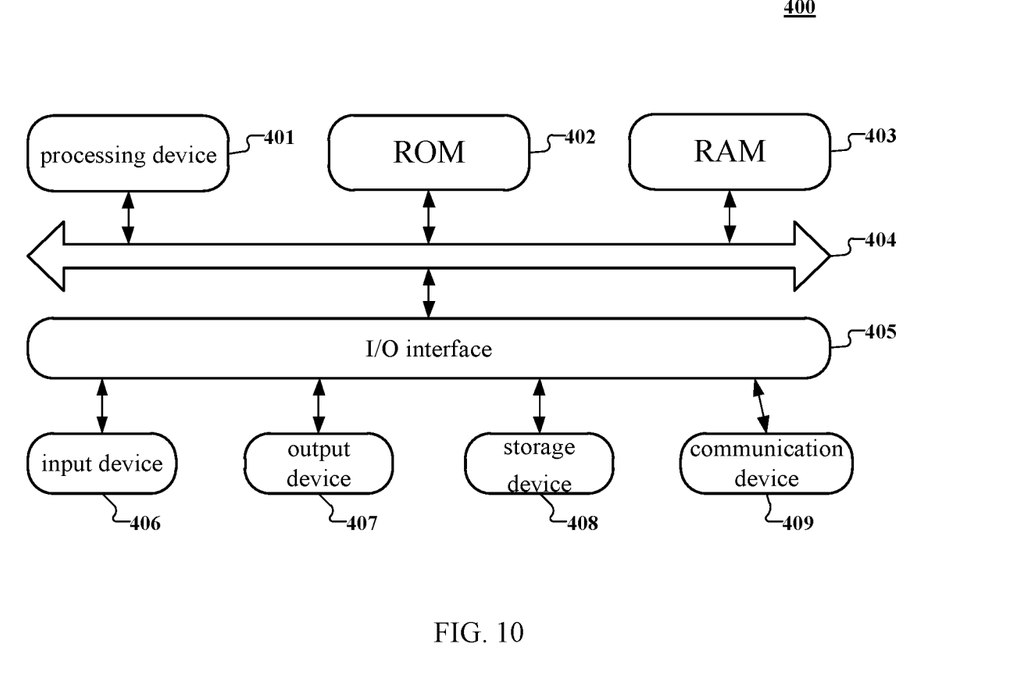
FIG. 10 is a schematic structural diagram of an electronic device according to an embodiment of the present disclosure.

Referring to FIG. 10 below, a schematic structural diagram of an electronic device 400 suitable for being used to realize the embodiments of the present disclosure is illustrated. Terminal devices in the embodiments of the present disclosure may include, but are not limited to, mobile terminals such as mobile phones, notebook computers, digital broadcast receivers, personal digital assistants (PDAs), PADs, portable multimedia players (PMPs) and vehicle-mounted terminals (for example, vehicle-mounted navigation terminals), and fixed terminals such as digital TVs and desktop computers. The electronic device shown in FIG. 10 is only an example, and should not bring any limitation to the functions and the scope of use of the embodiments of the present disclosure.

As shown in FIG. 10, the electronic device 400 may include a processing device (e.g., a central processor, a graphics processor, etc.) 401 that may perform a variety of suitable actions and processes in accordance with a program stored in a read-only memory (ROM) 402 or a program loaded from a storage device 408 into a random access memory (RAM) 403. In the RANI 403, various programs and data required for the operation of the electronic device 400 are also stored. The processing device 401, the ROM 402 and the RANI 403 are connected to each other via a bus 404. An input/output (I/O) interface 405 is also connected to the bus 404.

In general, the following devices may be connected to the I/O interface 405: an input device 406 including, for example, a touch screen, a touch pad, a keyboard, a mouse, a camera, a microphone, an accelerometer, a gyroscope, etc.; an output device 407 including, for example, a liquid crystal display (LCD), a speaker, a vibrator, etc.; a storage device 408 including, for example, magnetic tape, hard disk, etc.; and a communication device 409. The communication device 409 may allow the electronic device 400 to communicate in a wireless or wired manner with other devices to exchange data. Although FIG. 10 illustrates a electronic device 400 having a variety of devices, it should be understood that not all illustrated devices are required to be implemented or provided. More or fewer devices may alternatively be implemented or provided.

Particularly, in accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 409, or installed from the storage device 408, or installed from the ROM 402. When the computer program is executed by the processing device 401, the above-mentioned functions defined in the method of the embodiments of the present disclosure are performed.

It should be noted that the computer storage media described in embodiments of the present disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read only memory (ROM), an erasable programmable read-only memory (EPROM) or flash memory (FLASH), an optical fiber, a compact disc read-only memory (CD-ROM), an optical storage device, a magnetic storage device, or any suitable combination thereof. In the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

In some embodiments, the client and server can communicate with any currently known or future-developed network protocol such as HTTP (HyperText Transfer Protocol), and can communicate (for example, by communication network) with digital data in any form or medium. Examples of communication networks include local area networks ("LAN"), wide area networks ("WAN"), the Internet (for example, the Internet), and end-to-end networks (for example, ad hoc end-to-end networks), as well as any currently known or future-developed network.

The computer-readable medium can be contained in the electronic device; it may also be separate and not assembled into the electronic device.

The storage medium carries one or more program, wherein the program, when executed by a processor, cause the processor to perform the above method of the present disclosure.

Computer program code for carrying out operations of the present disclosure may be written in one or more programming languages, including object-oriented programming languages such as Java, Smalltalk, C++, and conventional procedural programming languages such as the "C" language or similar programming languages. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. Among them, the names of these units do not constitute a limitation on the unit itself under certain circumstances.

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, equipment, or device, or any suitable combination of the foregoing. More specific examples of machine-readable storage media may include electrical connections based on one or more wires, portable computer disks, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, an information processing method is provided, the information processing method comprises: determining a user identity corresponding to a client, first data information requested for reading, and a read permission corresponding to the user identity according to an information reading request of the client; generating adjusted first data information based on the user identity, the first data information, and the read permission; and sending the adjusted first data information to the client, wherein the first data information is allowed for online collaboration and comprises row data information and column data information, the column data information is allowed to be adjusted based on the read permission, wherein the column data information is allowed to be adjusted based on the read permission comprises shielding or deleting data information without read permissions.

According to one or more embodiments of the present disclosure, generating adjusted first data information based on the user identity, the first data information, and the read permission comprises: determining a readable data range based on the user identity, the first data information, and the read permission; and copying the first data information and adjusting the copied first data information based on the readable data range to generate the adjusted first data information.

According to one or more embodiments of the present disclosure, the information processing method further comprises: determine the user identity, second data information requested for editing, and an edit permission corresponding to the user identity according to edited data input by the client; determining an editable data range based on the user identity, the second data information, and the edit permission; adjusting the second data information based on the edited data when the edited data are within the editable data range, to generate first adjusted second data information; and discarding the edited data without adjusting the second data information when the edited data are not within the editable data range.

According to one or more embodiments of the present disclosure, when the edited data are not within the editable data range, a prompt is issued and/or an abnormal value is returned to the client.

According to one or more embodiments of the present disclosure, the information processing method further comprises: obtaining collaborative users of the second data information after generating the first adjusted second data information; generating second adjusted second data information based on a user identity of each corresponding collaborative user, the first adjusted second data information, and a read permission of the corresponding collaborative user; and sending the second adjusted second data information to the client corresponding to the corresponding collaborative user.

According to one or more embodiments of the present disclosure, generating second adjusted second data information based on the user identity of each corresponding collaborative user, the first adjusted second data information, and the read permission of the corresponding collaborative user comprises: determining a readable data range based on the user identity of each corresponding collaborative user, the first adjusted second data information, and the read permission of the corresponding collaborative user; and for each corresponding collaborative user, copying the first adjusted second data information, and adjusting the copied first adjusted second data information based on the readable data range to generate the second adjusted second data information.

According to one or more embodiments of the present disclosure, the information processing method further comprises: receiving permission rule updates for the first data information to generate updated permission rules; and obtaining, based on the updated permission rules, collaborative users of the first data information whose permissions are adjusted, to push the updated permission rules to each collaborative user.

According to one or more embodiments of the present disclosure, an information processing apparatus is provided, the information processing apparatus comprises: a determination module configured to determine a user identity corresponding to a client, first data information requested for reading, and a read permission corresponding to the user identity according to an information reading request of the client; a data adjustment module configured to generate adjusted first data information based on the user identity, the first data information, and the read permission; and a data sending module configured to send the adjusted first data information to the client, wherein the first data information is allowed for online collaboration and comprises row data information and column data information, the column data information is allowed to be adjusted based on the read permission, wherein the column data information is allowed to be adjusted based on the read permission comprises shielding or deleting data information without read permissions.

According to one or more embodiments of the present disclosure, an information processing method is provided, the information processing method comprises: receiving, by a client, permission rule updates pushed by a system for first data information, wherein the client is allowed to access to first adjusted first data information, and the first adjusted first data information is determined based on a user identity corresponding to the client, the first data information, and permission rules; determining second adjusted first data information based on the user identity, the first data information, and updated permission rules; and adjusting the first adjusted first data information to the second adjusted first data information, wherein adjusting the first adjusted first data information to the second adjusted first data information comprises shielding or deleting data information without read permissions.

According to one or more embodiments of the present disclosure, adjusting the first adjusted first data information to the second adjusted first data information comprises: deleting data information that has no read permissions anymore from the first adjusted first data information based on the updated permission rules.

According to one or more embodiments of the present disclosure, adjusting the first adjusted first data information to the second adjusted first data information comprises: obtaining data information with newly added read permissions from the system based on the updated permission rules.

According to one or more embodiments of the present disclosure, an information processing apparatus is provided, the information processing apparatus comprises: a permission rule update receiving module configured to allow a client to receive permission rule updates pushed by a system for first data information, wherein the client is allowed to access to first adjusted first data information, and the first adjusted first data information is determined based on a user identity, first data information, and permission rules corresponding to the client; an adjusted information determination module configured to determine second adjusted first data information based on the user identity, the first data information, and updated permission rules; and a data adjustment module configured to adjust the first adjusted first data information to the second adjusted first data information, wherein adjust the first adjusted first data information to the second adjusted first data information comprises shielding or deleting data information without read permissions.

According to one or more embodiments of the present disclosure, a terminal device is provided, the terminal device comprises: at least one memory and at least one processor; wherein the at least one memory is configured to store program code, and the at least one processor is configured to call the program code stored by the at least one memory to perform the above information processing method.

According to one or more embodiments of the present disclosure, a storage medium for storing program code is provided, the program code, when executed by a processor, cause the processor to perform the above information processing method.

The above description is only a preferred embodiment of the present disclosure and an explanation of the applied technical principles. Those skilled in the art should understand that the scope of disclosure involved in this disclosure is not limited to the technical solutions formed by the specific combination of the above technical features, and should also cover other combinations formed by the above technical features or their equivalent features. Technical solutions. For example, the above-mentioned features and the technical features disclosed in the present disclosure (but not limited to) having similar functions are replaced with each other to form a technical solution.

In addition, although the operations are depicted in a specific order, this should not be understood as requiring these operations to be performed in the specific order shown or performed in a sequential order. Under certain circumstances, multi-task and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An information processing method implemented by a server for ensuring data security in online collaboration, comprising:
   determining, by the server, a user identity corresponding to a client, first data information requested for reading, and a read permission corresponding to the user identity based on a request of reading information received from the client, wherein the first data information enables the online collaboration by a plurality of clients, and wherein the client is any of the plurality of clients;
   generating, by the server, adjusted first data information based on the user identity, the first data information, and the read permission, wherein the generating, by the server, adjusted first data information further comprises:
      determining a subset of data information in the first data information based on the read permission in response to receiving the request of reading information from the client, wherein the client has no permission of reading the subset of data information, and
      generating the adjusted first data information by shielding or deleting the subset of data information to ensure the data security and to prevent any unauthorized client from reading the subset of data information;
   sending, by the server, the adjusted first data information to the client;
   wherein the information processing method further comprises:
      determining second data information requested for editing by the client;
      generating first adjusted second data information based on editing data input by the client;
      determining a readable data range based on a user identity of each collaborative user, the first adjusted second data information, and a read permission of a corresponding collaborative user; and
      for each corresponding collaborative user, copying the first adjusted second data information and generating second adjusted second data information by adjusting the copied first adjusted second data information based on the readable data range.

2. The information processing method according to claim 1, wherein generating adjusted first data information based on the user identity, the first data information, and the read permission comprises:
   determining a readable data range based on the user identity, the first data information, and the read permission; and
   copying the first data information and adjusting the copied first data information based on the readable data range to generate the adjusted first data information.

3. The information processing method according to claim 1, further comprising:
   determine the second data information requested for editing and an edit permission corresponding to the user identity according to the editing data input by the client;
   determining an editable data range based on the user identity, the second data information, and the edit permission;
   adjusting the second data information based on the editing data when the editing data are within the editable data range, to generate the first adjusted second data information; and
   discarding the editing data without adjusting the second data information when the editing data are not within the editable data range.

4. The information processing method according to claim 3, wherein when the editing data are not within the editable data range, a prompt is issued or an abnormal value is returned to the client.

5. The information processing method according to claim 3, further comprising:
   identifying collaborative users of the second data information after generating the first adjusted second data information;
   generating the second adjusted second data information based on a user identity of each corresponding collaborative user, the first adjusted second data information, and a read permission of the corresponding collaborative user; and sending the second adjusted second data information to the client corresponding to the corresponding collaborative user.

6. The information processing method according to claim 1, further comprising:
receiving permission rule updates for the first data information to generate updated permission rules; and
obtaining, based on the updated permission rules, collaborative users of the first data information whose permissions are adjusted, to push the updated permission rules to each collaborative user.

7. An information processing method implemented by a client for ensuring data security in online collaboration, comprising:
receiving, by a client, updates of permission rules associated with first data information pushed by a server, wherein the first data information enables the online collaboration by a plurality of clients, wherein the client is any of the plurality of clients and is associated with any of collaborative users, wherein the client is allowed to access first adjusted first data information, and the first adjusted first data information is determined based on a user identity of a user corresponding to the client, the first data information, and the permission rules;
determining, by the client, a subset of data information in the first adjusted first data information based on the user identity and updated permission rules in response to receiving the updates of permission rules from the server, wherein the user has no permission of reading the subset of data information based on the updated permission rules;
generating, by the client, second adjusted first data information by shielding or deleting the subset of data information to ensure the data security and to prevent any unauthorized user from reading the subset of data information; and
receiving second adjusted second data information from the server, wherein the second adjusted second data is generated by the server based on determining second data information requested for editing, generating first adjusted second data information based on received editing data, determining a readable data range based on a user identity of each collaborative user, the first adjusted second data information, and a read permission of a corresponding collaborative user, copying the first adjusted second data information, and generating the second adjusted second data information by adjusting the copied first adjusted second data information based on the readable data range.

8. The information processing method according to claim 7, wherein adjusting the first adjusted first data information to the second adjusted first data information comprises:
deleting data information that has no read permissions anymore from the first adjusted first data information based on the updated permission rules.

9. The information processing method according to claim 7, wherein adjusting the first adjusted first data information to the second adjusted first data information comprises:
obtaining data information with newly added read permissions from the system based on the updated permission rules.

10. A non-transitory computer-readable storage medium for storing program code, and the program code, when executed by a processor, cause the processor to perform operations comprising:
determining, by a server, a user identity corresponding to a client, first data information requested for reading, and a read permission corresponding to the user identity based on a request of reading information received from the client, wherein the first data information enables the online collaboration by a plurality of clients, and wherein the client is any of the plurality of clients;
generating, by the server, adjusted first data information based on the user identity, the first data information, and the read permission, wherein the generating, by the server, adjusted first data information further comprises:
determining a subset of data information in the first data information based on the read permission in response to receiving the request of reading information from the client, wherein the client has no permission of reading the subset of data information, and
generating the adjusted first data information by shielding or deleting the subset of data information to ensure the data security and to prevent any unauthorized client from reading the subset of data information;
sending, by the server, the adjusted first data information to the client;
wherein the operations further comprise:
determining second data information requested for editing by the client;
generating first adjusted second data information based on editing data input by the client;
determining a readable data range based on a user identity of each collaborative user, the first adjusted second data information, and a read permission of a corresponding collaborative user; and
for each corresponding collaborative user, copying the first adjusted second data information and generating second adjusted second data information by adjusting the copied first adjusted second data information based on the readable data range.

11. The non-transitory computer-readable storage medium according to claim 10, wherein generating adjusted first data information based on the user identity, the first data information, and the read permission comprises:
determining a readable data range based on the user identity, the first data information, and the read permission; and
copying the first data information and adjusting the copied first data information based on the readable data range to generate the adjusted first data information.

12. The non-transitory computer-readable storage medium according to claim 10, wherein the information processing method further comprises:
determine the second data information requested for editing and an edit permission corresponding to the user identity according to the editing data input by the client;
determining an editable data range based on the user identity, the second data information, and the edit permission;
adjusting the second data information based on the editing data when the editing data are within the editable data range, to generate the first adjusted second data information; and
discarding the editing data without adjusting the second data information when the editing data are not within the editable data range.

13. The non-transitory computer-readable storage medium according to claim 12, wherein when the editing data are not within the editable data range, a prompt is issued or an abnormal value is returned to the client.

14. The non-transitory computer-readable storage medium according to claim 12, wherein the information processing method further comprises:
identifying collaborative users of the second data information after generating the first adjusted second data information;
generating the second adjusted second data information based on a user identity of each corresponding collaborative user, the first adjusted second data information, and a read permission of the corresponding collaborative user; and
sending the second adjusted second data information to the client corresponding to the corresponding collaborative user.

15. The non-transitory computer-readable storage medium according to claim 10, wherein the information processing method further comprises:
receiving permission rule updates for the first data information to generate updated permission rules; and
obtaining, based on the updated permission rules, collaborative users of the first data information whose permissions are adjusted, to push the updated permission rules to each collaborative user.

16. A terminal device, comprising:
at least one memory and at least one processor,
wherein the at least one memory is configured to store program code, and the at least one processor is configured to call the program code stored in the at least one memory to perform operations comprising:
determining, by a server, a user identity corresponding to a client, first data information requested for reading, and a read permission corresponding to the user identity based on a request of reading information received from the client, wherein the first data information enables the online collaboration by a plurality of clients, and wherein the client is any of the plurality of clients;
generating, by the server, adjusted first data information based on the user identity, the first data information, and the read permission, wherein the generating, by the server, adjusted first data information further comprises:
determining a subset of data information in the first data information based on the read permission in response to receiving the request of reading information from the client, wherein the client has no permission of reading the subset of data information, and
generating the adjusted first data information by shielding or deleting the subset of data information to ensure the data security and to prevent any unauthorized client from reading the subset of data information;
sending, by the server, the adjusted first data information to the client;
wherein the operations further comprise:
determining second data information requested for editing by the client;
generating first adjusted second data information based on editing data input by the client;
determining a readable data range based on a user identity of each collaborative user, the first adjusted second data information, and a read permission of a corresponding collaborative user; and
for each corresponding collaborative user, copying the first adjusted second data information and generating second adjusted second data information by adjusting the copied first adjusted second data information based on the readable data range.

17. The terminal device according to claim 16, the operations further comprising:
determine the second data information requested for editing and an edit permission corresponding to the user identity according to the editing data input by the client;
determining an editable data range based on the user identity, the second data information, and the edit permission;
adjusting the second data information based on the editing data when the editing data are within the editable data range, to generate the first adjusted second data information; and
discarding the editing data without adjusting the second data information when the editing data are not within the editable data range.

18. The terminal device according to claim 17, the operations further comprising:
in response to determining that the editing data are not within the editable data range, issuing a prompt or returning an abnormal value to the client.

19. The terminal device according to claim 16, the operations further comprising:
receiving permission rule updates for the first data information to generate updated permission rules; and
identifying, based on the updated permission rules, collaborative users of the first data information whose permissions are adjusted, to push the updated permission rules to each collaborative user.

* * * * *